United States Patent [19]
Baumeister et al.

[11] Patent Number: 6,045,148
[45] Date of Patent: *Apr. 4, 2000

[54] SEMI-TRAILER COUPLING

[75] Inventors: Bernhard Baumeister, Lage; Kurt Theopold, Lemgo; Richard Bugaj, Bottrop; Peter Günther, Hagen, all of Germany

[73] Assignee: Rutgers Automotive Aktiengesellschaft, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/945,972
[22] PCT Filed: Feb. 28, 1997
[86] PCT No.: PCT/EP97/00974
   § 371 Date: Jan. 26, 1998
   § 102(e) Date: Jan. 26, 1998
[87] PCT Pub. No.: WO97/32772
   PCT Pub. Date: Sep. 12, 1997

[30] Foreign Application Priority Data

Mar. 9, 1996 [DE] Germany .............. 196 09 314

[51] Int. Cl.[7] ................................... B62D 53/08
[52] U.S. Cl. ............................... 280/433; 384/421
[58] Field of Search ................... 280/400, 433, 280/441.1; 384/421; 188/251 A, 250 B

[56] References Cited

U.S. PATENT DOCUMENTS

| | | | |
|---|---|---|---|
| 3,924,909 | 12/1975 | Kent et al. | 280/433 |
| 4,752,081 | 6/1988 | Reeners et al. | 280/433 |
| 4,946,184 | 8/1990 | Larocco | 280/433 |
| 5,263,856 | 11/1993 | Huehn et al. | 384/421 |
| 5,417,308 | 5/1995 | Hartl | 280/433 |
| 5,431,424 | 7/1995 | Colwell | 280/433 |
| 5,522,613 | 6/1996 | Heeb | 280/433 |
| 5,746,438 | 5/1998 | Bergmann et al. | 280/433 |

*Primary Examiner*—Anne Marie Boehler
*Attorney, Agent, or Firm*—Blakely Sokoloff Taylor & Zafman

[57] ABSTRACT

In a fifth wheel with a multipart sliding segmental lining which is rotationally and fixedly arranged on a coupling plate. Comfort is improved and a high service life is made possible by the fact that the sliding segment lining comprises a frictional material, the coefficient of friction of the sliding surface of the sliding surface lining being in the region of 0.1 to 0.2.

9 Claims, 1 Drawing Sheet

SEMI-TRAILER COUPLING

BACKGROUND OF THE INVENTION

1. Field of the Invention

The invention relates to a fifth wheel including a coupling plate, a rotary joint and a preferably multipart sliding segmental lining which is rotationally fixedly arranged on the coupling plate and affords an upwardly directed sliding surface constituting an engagement surface for a semitrailer.

2. Description of the Related Art

Conventional fifth wheels are predominantly provided with sliding segments of steel whose sliding surface must be lubricated with grease in order to produce the desired frictional values and to avoid noise nuisance when two highly loaded steel surfaces frictionally slide against one another. A further disadvantage of this conventional fifth wheel construction resides in the temperature-dependent viscosity of the grease constituting the lubricant. At extremely low temperatures, for instance in use in arctic regions, the grease loses its lubricating properties; when used in hot areas the grease film rapidly breaks down and drips onto the road covering. The latter constitutes a heavy environmental burden which is difficult to tolerate.

Attempts have therefore been made to produce sliding segments for fifth wheels from special plastic mixtures which are supposed to ensure constant sliding characteristics between the trailer and coupling plate, even without lubrication. The load bearing capacity and stability of such lubricant-free sliding segments were previously not capable of being fully satisfactory.

BRIEF SUMMARY OF THE INVENTION

It is the object of the invention to provide fifth wheels with lubricant-free sliding segments whose sliding properties are practically independent of temperature and which make a high use comfort and a high service life possible.

This object is solved in accordance with the invention in a fifth wheel of the type referred to above if the sliding segmental lining comprises a frictional material and if the sliding surface of the sliding segmental lining has a coefficient of friction in the range of 0.1 to 0.2.

Surprisingly, it transpires that the relatively high coefficient of friction of 0.1 to 0.2 of machined frictional material surfaces ensures an optimum sliding behaviour of the trailer on the sliding surface. The friction is large enough to prevent swaying and thus critical driving situations of the semi-trailer. The mechanical strength of the frictional material has been tested and proved many times in brake linings. The frictional material is unchanged even at extremely low temperatures of −50° C. and also at extremely high temperatures of, for instance, 300° C. and its coefficient of friction remains substantially constant. An important advantage of the frictional material used in accordance with the invention resides in its compatibility with opposing surfaces coated with grease on the underside of the semitrailer. This is an economic requirement by haulage companies whose trailer park will still necessitate for many years a mixed usage of semitrailers on semitrailer towing vehicles of conventional and new construction.

BRIEF DESCRIPTION OF THE DRAWINGS

An exemplary embodiment of a fifth wheel, in which the invention can be realized, is shown schematically in the drawings, in which.

DETAILED DESCRIPTION OF THE INVENTION

In a preferred embodiment of the invention the sliding segmental lining is moulded from a moulding composition which contains:

30–45% Bonding agent

35–55% Textile and/or glass and/or mineral fibres and/or chips

5–14% Processing adjuvants

0–8% Friction modifying agents.

The moulding composition has proved to be particularly satisfactory which contains 30–45% Bonding agent 5–10% Setting agent 30–40% Textile chips 5–15% Textile threads

0–8% PTFE

1–4% Black pigments.

Phenol novolak is suitable as the bonding agent and hexamethylene tetramine can be provided as the setting agent.

The moulding composition produced in accordance with the above composition is mixed in a dry process in the molten state, for instance with the aid of a worm kneading machine, and subsequently ground. The resultant material is pressed into the desired sliding segment shape and surface machined, at least in the region of the sliding surface. After installation of the finished sliding segment onto the saddle plate a fifth wheel is produced which exhibits a hitherto unachieved constant frictional or sliding behaviour with respect to the opposing surfaces defined on the trailer and is practically corrosion resistant.

In another embodiment of the invention a frictional composition with the following composition is used:

15–30% Bonding agent

10–30% Fibre material, particularly textile and/or glass fibres

10–25% Fillers

20–60% Friction modifying agent.

The frictional composition described above is pre-shaped in the manner known in connection with brake linings and subjected to a warm pressing process under temperature, pressure and time conditions. Post-machining of the surfaces to smoothen the sliding surface terminates the production of the sliding segment.

A further alternative embodiment is characterised by a sintered material constituting the frictional material. The sintered material comprises iron and/or non-ferrous metals and/or carbon and/or phosphorous and/or sulphur and/or alloys thereof and/or compounds thereof in an amount of at least 50 vol. % and one or more lubricants/sliding agents. The sintered composition can additionally be impregnated with one or more lubricants/sliding agents.

The fifth wheel which is designated as a whole with 1, rests on a saddle plate bearing 2, which is arranged on a pedestal on the semitrailer towing vehicle 3.

Figure 1:
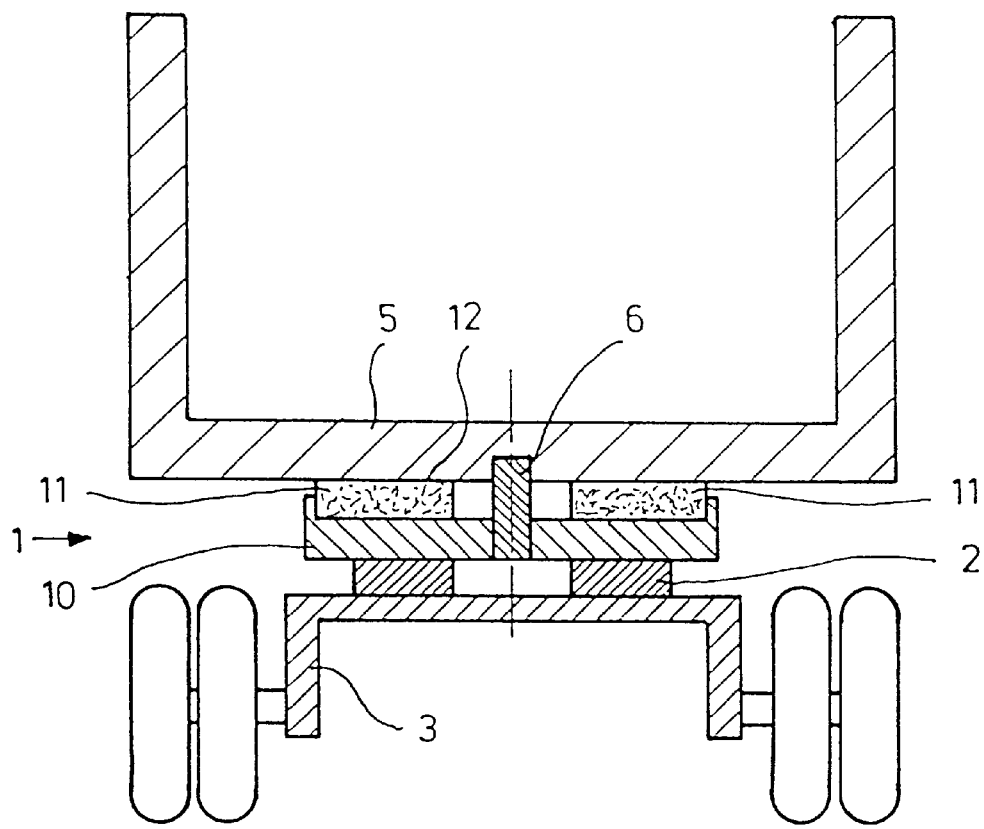
FIG. 1 shows an exemplary embodiment of the fifth wheel in the installed position between a semitrailer towing vehicle which is shown indicatively and a semitrailer, which is also shown indicatively.
Figure 2:
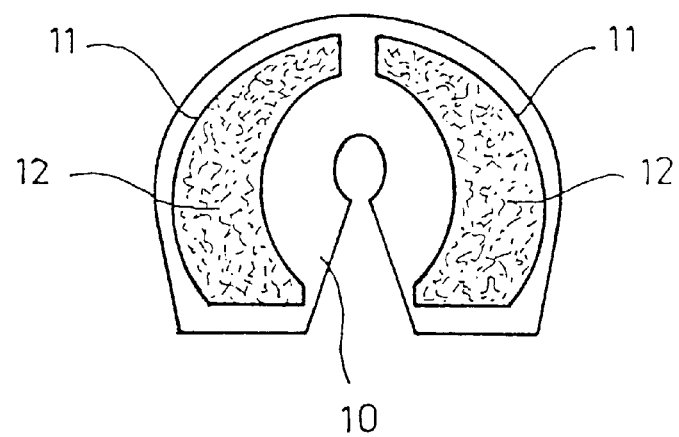
FIG. 2 is a plan view of the fifth wheel shown in FIG. 1.

The rotary joint between the fifth wheel 1 and the semi-trailer 5 comprises a king pin 6. The usual locking elements, particularly the usual dropping locking device and the associated manual actuating elements, are not shown in FIG. 1.

The fifth wheel has a saddle plate 10, supported by the saddle plate bearing 2, comprising steel and sliding or frictional lining segments 11 which, in accordance with the invention, comprise a frictional material. The frictional lining segments 11 are machined on their upwardly directed sliding surfaces 12 and have at that point a coefficient of friction in the range of 0.1 to 0.2 which ensures a comfortable sliding action with the opposing surface defined on the underside of the semitrailer. Sliding of the sliding surfaces 12 against the engaging opposing surfaces, which is substantially free of swaying and produces little noise, is thereby ensured.

The sliding segments, which, in accordance with the invention, comprise frictional material, have similar advantages, even in allied uses, for instance in the chassis of heavy freight vehicles, railway bogies and all other bogies, in which relatively high rotational damping is desired.

We claim:

1. A fifth wheel assembly, comprising:

a coupling plate;

an engagement surface for a semitrailer; and a sliding segmental lining fixedly arranged on the coupling plate so as to afford at least one upwardly directed sliding surface constituting the engagement surface for the semitrailer, the at least one upwardly directed sliding surface including a frictional material having a coefficient of friction in the range of 0.1 to 0.2, wherein the frictional material of the sliding segmental lining comprises 15–30% bonding agent, 10–30% fibres, 10–25% fillers, and 20–60% friction modifying agents.

2. The assembly of claim 1 wherein the sliding segmental lining comprises a plurality of sliding segments arranged so as to form a multi part upwardly directed sliding surface.

3. A fifth wheel assembly, comprising:

a coupling plate;

an engagement surface for a semitrailer; and a sliding segmental lining fixedly arranged on the coupling plate so as to afford at least one upwardly directed sliding surface constituting the engagement surface for the semitrailer, wherein the sliding segmental lining comprises a frictional material and is moulded from a moulding composition which comprises 30–45% bonding agent, 35–55% textile agent comprising at least one of the following components: textile fibers, textile chips, mineral fibres, mineral chips, glass fibres and glass chips, 5–14% processing adjuvants, and 0–8% friction modifying agents, and further wherein the at least one upwardly directed sliding surface including the frictional material having a coefficient of friction in the range of 0.1 to 0.2.

4. The fifth wheel of claim 3, wherein the 35–55% textile agent comprises 30–40% textile chips and 5–15% textile fibres, and wherein the moulding composition further comprises 5–10% setting agent and 1–4% black pigments.

5. The fifth wheel of claim 4, wherein the 30–45% bonding agent comprises phenol novolak and the 5–10% setting agent comprises hexamethylene tetramine.

6. The fifth wheel of claim 4, wherein the 0–8% friction modifying agents include polytetrafluoroethylene (PTFE).

7. The assembly of claim 3 wherein the sliding segmental lining comprises a plurality of sliding segments arranged so as to form a multi part upwardly directed sliding surface.

8. The assembly of claim 7 wherein the 35–55% textile agent comprises 30–40% textile chips and 5–15% textile fibres and the moulding composition further comprises 5–10% setting agent, and 1–4% black pigments.

9. The assembly of claim 3 wherein the 0–8% friction modifying agents include polytetrafluoroethylene (PTFE).

* * * * *

UNITED STATES PATENT AND TRADEMARK OFFICE
CERTIFICATE OF CORRECTION

PATENT NO. : 6,045,148  
DATED : April 4, 2000  
INVENTOR(S) : Baumeister et al.

Page 1 of 1

It is certified that error appears in the above-identified patent and that said Letters Patent is hereby corrected as shown below:

Title page,
Item [30], Foreign Application Priority Data, please delete number "196 09 314" and insert -- 196 09 314.7 --.

Signed and Sealed this

Eighth Day of January, 2002

*Attest:*

JAMES E. ROGAN
*Attesting Officer* — *Director of the United States Patent and Trademark Office*